United States Patent
Kim et al.

(10) Patent No.: US 9,586,144 B2
(45) Date of Patent: Mar. 7, 2017

(54) CONTENTS PROVIDING SYSTEM AND OPERATING METHOD THEREOF

(71) Applicant: Samsung Electronics Co., Ltd., Gyeonggi-do (KR)

(72) Inventors: So-Young Kim, Seoul (KR); Hyun-Joo Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 592 days.

(21) Appl. No.: 13/740,035

(22) Filed: Jan. 11, 2013

(65) Prior Publication Data
US 2013/0184075 A1 Jul. 18, 2013

(30) Foreign Application Priority Data

Jan. 13, 2012 (KR) .................. 10-2012-0004255

(51) Int. Cl.
*A63F 9/24* (2006.01)
*A63F 13/00* (2014.01)
(Continued)

(52) U.S. Cl.
CPC .............. *A63F 13/69* (2014.09); *A63F 13/52* (2014.09); *A63F 13/53* (2014.09); *A63F 13/537* (2014.09);
(Continued)

(58) Field of Classification Search
CPC ........... G06Q 30/0209; G06Q 30/0222; G06Q 30/0224; G06Q 30/0241; G06Q 30/0251; G06Q 30/0253; G06Q 30/0257
See application file for complete search history.

(56) References Cited

U.S. PATENT DOCUMENTS 7,559,073 B2 * 7/2009 Marler et al. .................. 725/50
7,913,157 B1 * 3/2011 Stoakley et al. .............. 715/203
(Continued)

FOREIGN PATENT DOCUMENTS

| JP | 2003-099658 | 4/2003 |
|---|---|---|
| KR | 10-00995676 | 11/2010 |
| WO | WO 01/65841 A1 | 9/2001 |

OTHER PUBLICATIONS

International Search Report dated Apr. 23, 2013 in connection with International Patent Application No. PCT/KR2013/000091, 3 pages.
(Continued)

*Primary Examiner* — Steven J Hylinski

(57) ABSTRACT

According to one embodiment, a content providing system of a terminal in a content providing system, a content server is requested to provide specific content. The specific content and a reward item associated with the specific content are received from the content server. A reward item list representing reward items associated with content having content providers different from each other is generated. The reward item list is displayed. Multiple content are received from a plurality of content providers. A corresponding reward item is determined for each received content. A specific content provide request is received from the terminal. The requested content and a reward item corresponding to the requested content are then transmitted to the terminal.

20 Claims, 12 Drawing Sheets

(51) Int. Cl.
*A63F 13/69* (2014.01)
*A63F 13/792* (2014.01)
*A63F 13/52* (2014.01)
*A63F 13/53* (2014.01)
*A63F 13/537* (2014.01)
*A63F 13/822* (2014.01)
*G06Q 30/02* (2012.01)

(52) U.S. Cl.
CPC .......... *A63F 13/792* (2014.09); *A63F 13/822* (2014.09); *G06Q 30/02* (2013.01); *A63F 2300/50* (2013.01); *A63F 2300/55* (2013.01); *A63F 2300/5553* (2013.01); *A63F 2300/609* (2013.01); *G06Q 30/0209* (2013.01); *G06Q 30/0255* (2013.01)

(56) References Cited

U.S. PATENT DOCUMENTS

| | | | |
|---|---|---|---|
| 8,613,019 B2* | 12/2013 | Kinder et al. | 725/40 |
| 2002/0004743 A1* | 1/2002 | Kutaragi et al. | 705/14 |
| 2003/0172376 A1* | 9/2003 | Coffin, III | 725/22 |
| 2004/0148221 A1* | 7/2004 | Chu | 705/14 |
| 2007/0192784 A1* | 8/2007 | Postrel | 725/23 |
| 2007/0283398 A1 | 12/2007 | Bowles | |
| 2007/0288951 A1* | 12/2007 | Ray et al. | 725/23 |
| 2008/0229352 A1* | 9/2008 | Pino et al. | 725/22 |
| 2008/0244635 A1* | 10/2008 | Pollard et al. | 725/23 |
| 2008/0244666 A1* | 10/2008 | Moon et al. | 725/87 |
| 2009/0099928 A1* | 4/2009 | Vasile | 705/14 |
| 2010/0099064 A1 | 4/2010 | Kato et al. | |
| 2010/0306402 A1* | 12/2010 | Russell et al. | 709/231 |
| 2011/0035264 A1* | 2/2011 | Zaloom | 705/14.12 |
| 2011/0312423 A1 | 12/2011 | Mosites et al. | |
| 2014/0128165 A1* | 5/2014 | Ganz | 463/42 |

OTHER PUBLICATIONS

Written Opinion of the International Searching Authority dated Apr. 23, 2013 in connection with International Patent Application No. PCT/KR2013/000091, 5 pages.

* cited by examiner

NOT POSSESSED STICKER SELECTED

POSSESSED STICKER SELECTED

CONTENTS PROVIDING SYSTEM AND
OPERATING METHOD THEREOF

CROSS-REFERENCE TO RELATED
APPLICATION(S) AND CLAIM OF PRIORITY

The present application is related to and claims the benefit under 35 U.S.C. §119(a) of a Korean patent application filed in the Korean Intellectual Property Office on Jan. 13, 2012 and assigned Serial No. 10-2012-0004255, the entire disclosure of which is hereby incorporated by reference.

TECHNICAL FIELD OF THE INVENTION

The present invention relates to a content providing system. More particularly, the present invention relates to a technology for providing the content providing system to promote content purchase and consumption.

BACKGROUND OF THE INVENTION

Recently, as a multimedia technology develops, various types multimedia content are provided. Accordingly, companies providing the multimedia content provide a reward service for promoting purchase and consumption of content provided by the companies. For example, a company providing children-oriented content provides a character sticker regarding purchased content to a user who has purchased content via a website of the company to provide a service allowing the consumer to play games using the sticker in the website.

Since the above-described conventional sticker providing service provides only a sticker associated with the content provided by a relevant company in a specific website, a consumer plays games using only a limited sticker provided via a specific website. However, observation of children's' games under an actual off-line environment shows that most of children collect various characters in one place and play games in another. Therefore, the above-described conventional sticker providing service has a limitation in meeting consumers' various playing desires, and thus it can be difficult to expect content purchase and consumption promotion effects via the sticker providing service.

SUMMARY OF THE INVENTION

To address the above-discussed deficiencies of the prior art, it is a primary object is to provide a method and an apparatus for promoting content consumption using reward items corresponding to content purchased in a content providing system.

Another aspect of the present invention is to provide a method and an apparatus for providing a game playing service that simultaneously uses various reward items provided by different content providers in a content providing system.

Still another aspect of the present invention is to provide a method and an apparatus for inducing content purchase and consumption by providing an additional reward item depending on a user's content purchase history and a reward item possess state in a content providing system.

Yet another aspect of the present invention is to provide a method and an apparatus for providing various game playing services simultaneously using various reward items provided by different content providers in a content providing system.

In accordance with an aspect of the present invention, a method of a terminal in a content providing system is provided. The method includes requesting that a content server provide specific content, receiving the specific content and one or more reward items associated with the specific content from the content server, generating a reward item list representing reward items associated with the content having content providers that are different from each other, and displaying the reward item list.

In accordance with another aspect of the present invention, a method of a content server in a content providing system is provided. The method includes receiving a plurality of content from a plurality of content providers, determining a corresponding one or more reward items for respective received content, receiving a specific content provide request from a terminal, and transmitting the requested content and the reward items corresponding to the requested content to the terminal.

In accordance with still another aspect of the present invention, an apparatus of a terminal in a content providing system is provided. The apparatus includes a communication unit configured to communicate with a content server, and a controller configured to control functions for requesting the content server to provide specific content, receiving the specific content and one or more reward items associated with the specific content from the content server, generating a reward item list representing reward items associated with content having content providers that are different from each other, and displaying the reward item list.

In accordance with further another aspect of the present invention, an apparatus of a content server in a content providing system is provided. The apparatus includes a communication unit configured to communicate with a terminal and a plurality of content providers, and a controller configured to control functions for receiving a plurality of content from the plurality of content providers, determining a corresponding one or more reward items for respective received content, and when receiving a specific content provide request from the terminal, transmitting the requested content and a reward item corresponding to the requested content to the terminal.

Other aspects, advantages and salient features of the invention will become apparent to those skilled in the art from the following detailed description, which, taken in conjunction with the annexed drawings, discloses Certain embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computing devices. The present invention relates to a technology for providing a reward item corresponding to content purchase to promote content purchase and consumption.

The following description with reference to the accompanying drawings is provided to assist in understanding of example embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Certain embodiments of the present invention provide a method and an apparatus for providing a game playing service that simultaneously uses various reward items provided by content providers different from each other in a content providing system. The reward item may be content formed of at least one of a still image, a moving picture, music, and audio associated with purchased content. Though the present invention is described using image content (referred as a 'sticker' for convenience of description) representing a character, an object, or landscape, and the like associated with purchased content as an example, the same method is applicable to other types of reward items.

Figure 1:
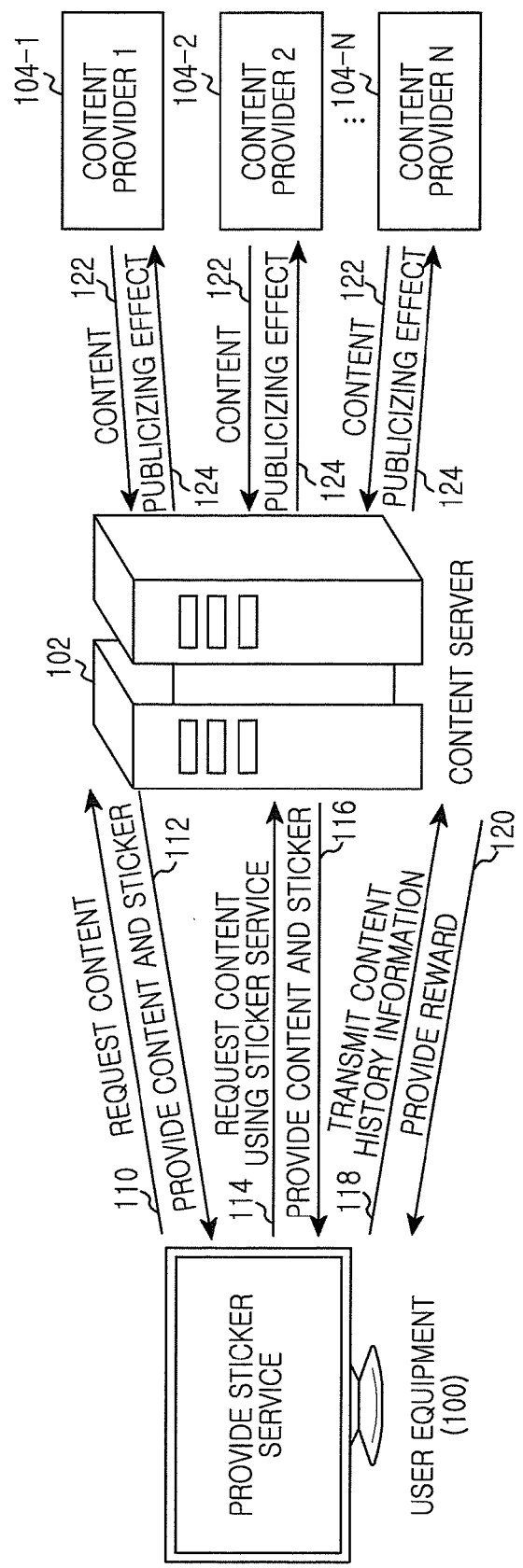
FIG. 1 illustrates an example content providing system according to certain embodiments of the present invention.

FIG. 1 illustrates an example content providing system according to certain embodiment of the present invention.

Referring to FIG. 1, the content providing system includes a user equipment 100, a content server 102, and a plurality of content providers (i.e., content servers) 104-1 to 104-N. Here, the user equipment 100 denotes one of various types of electronic devices that can purchase content via communication with the server, and may include a digital television (TV), a mobile communication terminal, a mobile terminal, a desktop personal computer (PC), a notebook PC, a tablet, and the like for example.

The user equipment 100 purchases content via communication with the content server 102, and receives a sticker as a reward item in reward for content purchase or use of purchased content from the content server 102 to perform a game playing function using the received sticker, that is, a sticker service function. Specifically, the user equipment 100 transmits a signal requesting (110) content which the user equipment 100 desires to purchase to the content server 102, and receives (112) the associated content and a sticker associated with the content from the content server 102. After that, the user equipment 100 executes a sticker service program that plays games using a sticker to provide a user interface that plays game using the received sticker. At this point, the sticker service program obtains in advance information regarding some or all stickers that can be obtained from the content server 102, so that it can discriminate and display the received sticker and a not received sticker on a screen. In addition, the sticker service program provides an interface that plays games using different stickers simultaneously provided by content providers that are different from each other. In addition, the sticker service program induces content purchase 114 and 116 corresponding to the not received sticker by providing content information associated with the not received sticker. In addition, the user equipment 100 transmits (118) information representing content use or purchase, that is, content history information to the content server 102, and receives (120) a reward item corresponding to the content history from the content server 102. At this point, the reward item may be a sticker, and may be various items such as other content associated with the content, a point, content purchase related coupon, and the like.

The content server 102 receives (122) content from a plurality of content providers 104-1 to 104-N, generates a sticker associated with respective provided content, and maps the sticker to the content to store the same. Of course, the sticker may be received from respective content providers 104-1 to 104-N. When specific content are requested (110, 114) by the user equipment 100, the content server 102 retrieves the relevant content and a sticker associated with the relevant content to provide (112, 116) the same to the user equipment 100. In addition, when receiving (118) content history information from the user equipment 100, the content server 102 retrieves one or more reward items corresponding to the content history to provide (120) the reward items to the user equipment 100. In addition, as content provided by the content providers 104-1 to 104-N and related stickers change, the content server 102 updates the sticker service program to provide the same to the user equipment 100. For example, when new content are provided by the plurality of content providers 104-1 to 104-N, the content server 102 generates a sticker associated with the provided content, and then adds information associated with new content and a new sticker to the sticker service program to provide the updated sticker service program to the user equipment 100. As described above, the content server 102 provides a sticker associated with the purchased content to the user equipment 100, and provides the sticker service program that allows a user to play games simultaneously using all stickers provided by the content providers 104-1 to 104-N, thereby inducing the user equipment 100 to purchase various content to provide a promoting effect for the content providers 104-1 to 104-N.

Figure 2:
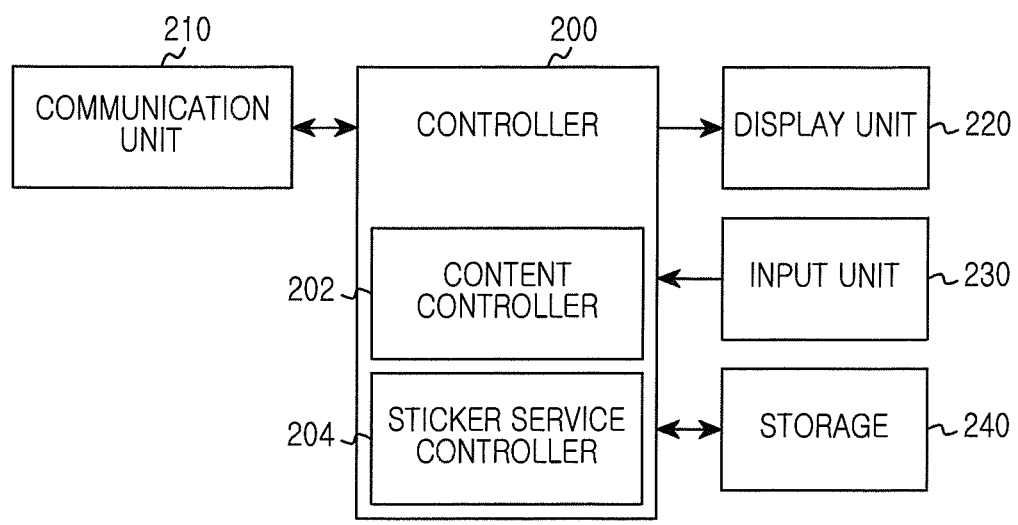
FIG. 2 illustrates an example user equipment according to certain embodiments of the present invention.

FIG. 2 illustrates an example user equipment according to certain embodiment of the present invention.

Referring to FIG. 2, the user equipment includes a controller 200, a communication unit 210, a display unit 220, an input unit 230, and a storage 240. Particularly, the controller 200 includes a content controller 202 and a sticker service controller 204.

The controller 200 controls and processes an overall operation of the user equipment. Particularly, according to the present invention, the controller 200 accesses a content server via the content controller 202 to control and process functions for purchasing content and providing a sticker service that uses a sticker obtained by the content purchase via the sticker service controller 204.

That is, when a content server access event occurs under user control, the content controller 202 controls and processes functions for receiving a content possess list from the content server to display the same, and then requesting the content server to transmit content which the user desires to purchase in response to a user input via the input unit 230, and receiving and storing the content and a sticker associated with the content from the content server. In addition, the content controller 202 receives a request from the sticker service controller 204 to control and process a function for purchasing content from the content server.

Figure 7A:
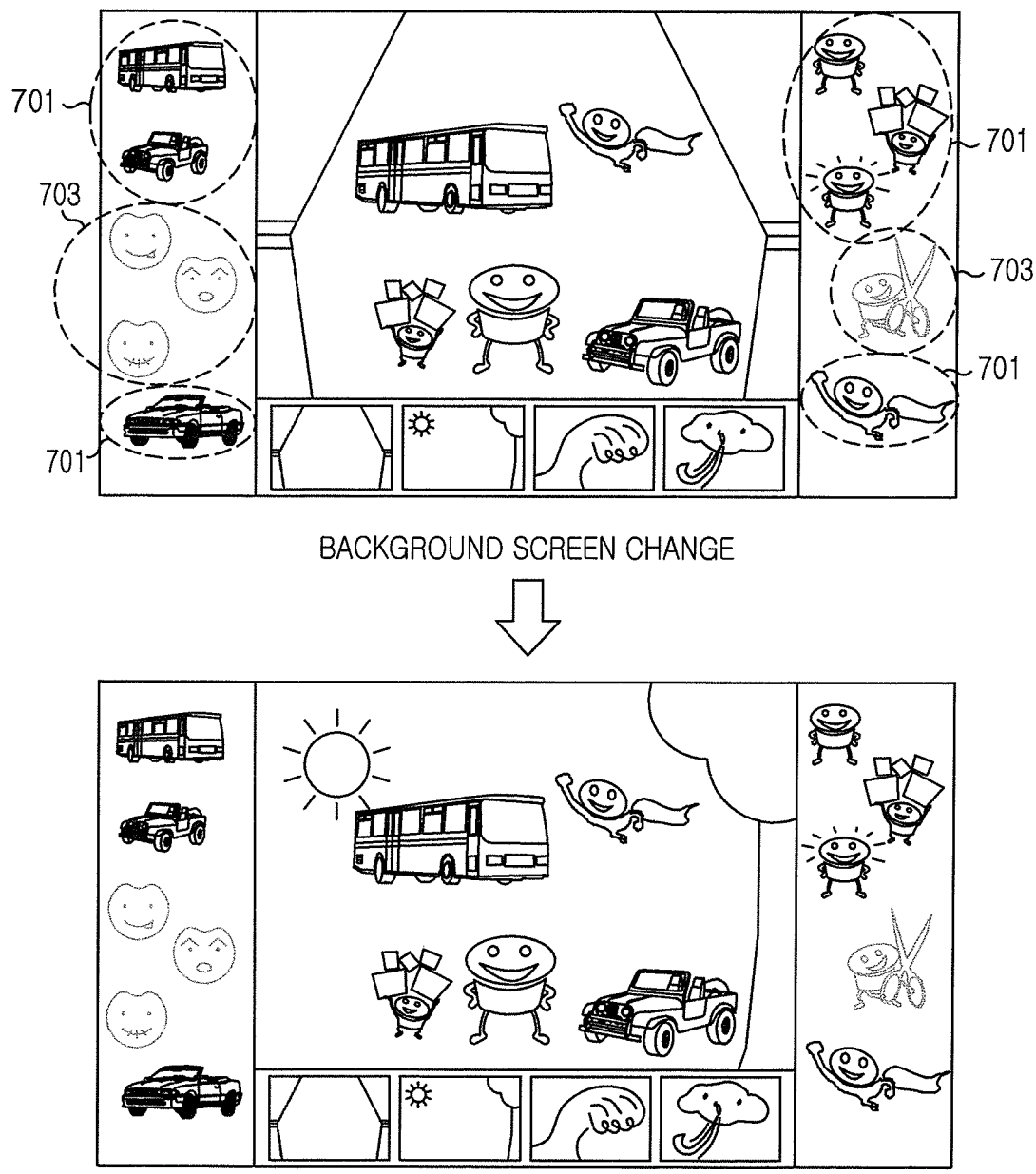
FIGS. 7A and 7B illustrate example screen configuration of a game playing service that uses a reward item in user equipment according to certain embodiments of the present invention.
Figure 7B:
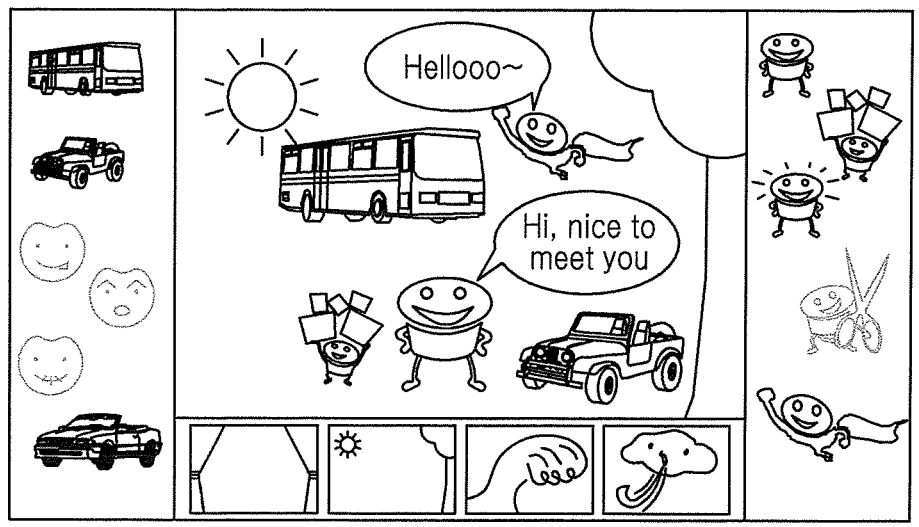

The sticker service controller 204 executes a sticker service program under user control to control and process a function for providing a game playing function using a sticker received from the content server. When a sticker is received from the content server, the sticker service controller 204 determines information associated with the received sticker to register the information associated with the sticker in a possess sticker list representing a possess sticker state of the terminal (user equipment). At this point, the sticker service controller 204 controls and processes a function for discriminating and displaying a possessed sticker and a not possessed sticker by obtaining in advance information regarding all stickers that can be obtained from the content server via communication with the content server. In addition, the sticker service controller 204 controls and processes a function for providing an interface that plays game simultaneously using different stickers provided by content providers different from each other. In addition, the sticker service controller 204 controls and processes a function for providing content information associated with a not possessed sticker to the user. For example, the sticker service controller 204 provides information associated with content via which the not possessed sticker may be obtained. When the user desires to purchase the relevant content, the sticker service controller 204 requests the content controller 202 to purchase the relevant content. In addition, the sticker service controller 204 controls and processes a function for providing a game playing function that uses stickers possessed by the terminal, for example, a doll game that uses stickers. At this point, the doll game denotes a game of arranging various stickers on desired positions and changing a background or inputting a dialog as illustrated in FIGS. 7A and 7B.

The communication unit 210 performs communication with the content server under control of the controller 200. Particularly, the communication unit 210 requests the content server to transmit content which the user desires to purchase, and receives the relevant content and a related sticker from the content server.

The display unit 220 displays various state information, numbers, characters, and images generated during an operation of the terminal, and displays various images corresponding to execution of the sticker service under control of the controller 200. For example, the display unit 220 displays images illustrated in FIGS. 7A to 8B.

The input unit 230 includes at least one function key and touch sensor to provide a coordinate of a key pressed by a user or a position touched by the user to the controller 200.

The storage 240 stores various programs required for the operation of the terminal and data. Particularly, according to the present invention, the storage 240 stores the sticker service program, content, and a sticker associated with the relevant content received from the content server. At this point, the sticker service program may be updated when the terminal accesses the content server under control of the controller 200.

The method described above in relation with FIG. 2 under of the present invention may be provided as one or more instructions in one or more software modules stored in the respective user equipments.

Figure 3:
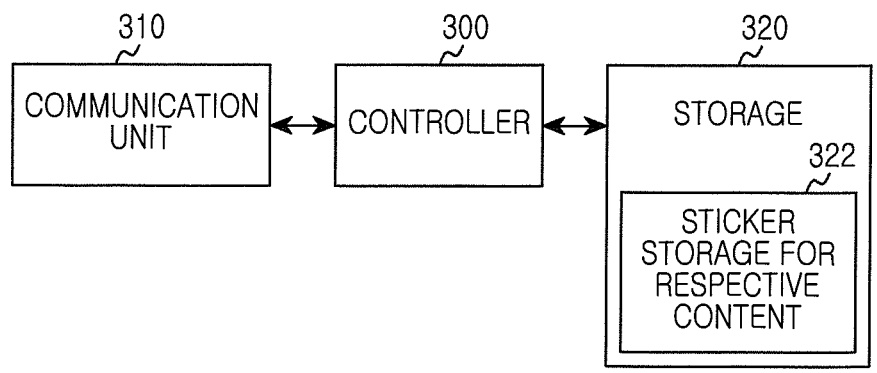
FIG. 3 illustrates an example content server according to certain embodiments of the present invention.

FIG. 3 illustrates an example content server according to certain embodiments of the present invention.

Referring to FIG. 3, the server includes a controller 300, a communication unit 310, and a storage 320. Particularly, the controller 300 includes a sticker storage for respective content 322.

The controller 300 controls and processes an overall operation of the content server. That is, when content are provided by a plurality of content providers, the controller 300 controls and processes a function for generating a sticker associated with respective provided content, and mapping the sticker to the content to store the same. The controller 300 controls and processes a function for providing a content list representing content possessed by the content server to the user equipment that has accessed the content server, and when the user equipment requests specific content, the controller 300 controls and processes a function for retrieving the relevant content and a sticker associated with the content to provide the same to the user equipment. In addition, when content history information is received from the user equipment, the controller 300 controls and processes a function for retrieving a reward item corresponding to the content history according to a predetermined rule and providing the same to the user equipment. In addition, when content provided by the content providers change or stickers associated with the content change, the controller 300 controls and processes a function for updating the sticker service program and providing the same to the user equipment. For example, when new content are provided by a specific content provider, the controller 300 controls and processes functions for generating a sticker associated with the provided content, storing the new content and the generated sticker, and adding information associated with new content and the generated sticker to the sticker service program to provide the same to the user equipment.

The communication unit 310 communicates with the user equipment under control of the controller 300. Particularly, the communication unit 310 is requested by the user equipment to provide specific content, and transmits the relevant content and a sticker associated with the relevant content to the user equipment.

The storage 320 stores various programs required for operation of the content server and data. Particularly, the storage 320 stores content provided by various content providers. According to the present invention, the storage 320 includes the sticker storage for respective content 322 to store a sticker associated with respective content. In addition, the storage 320 may store a sticker service program, and store a table representing reward items corresponding to a content purchase history or a content use history. At this point, the reward item may be a sticker, and may be various items such as other content associated with the content, a point, a content purchase related coupon, and the like.

The method described above in relation with FIG. 3 under of the present invention may be provided as one or more instructions in one or more software modules stored in the respective server.

Figure 4A:
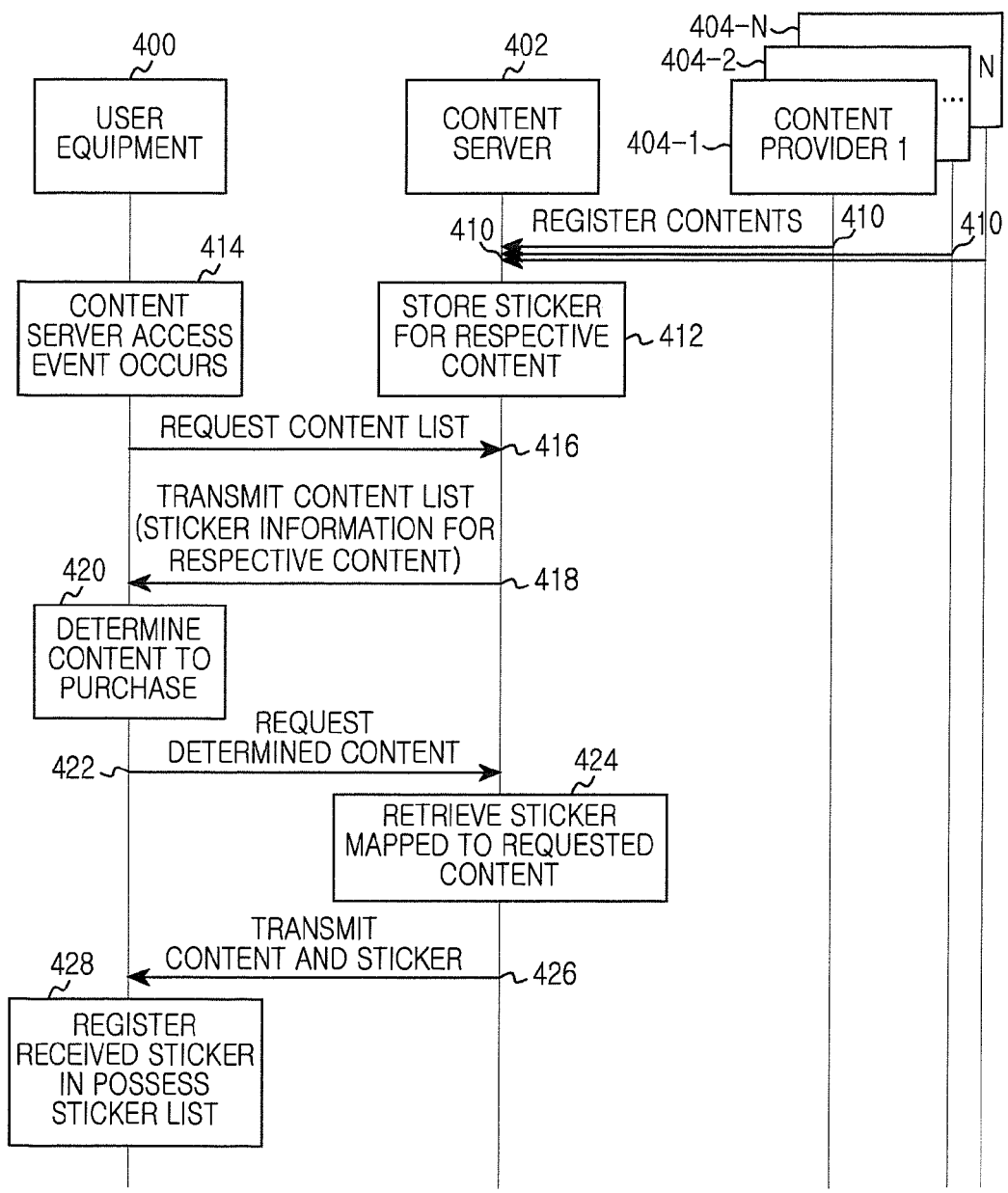
FIGS. 4A and 4B illustrate example signal flows for providing a reward item corresponding to content purchase in a content providing system according to certain embodiments of the present invention.
Figure 4B:
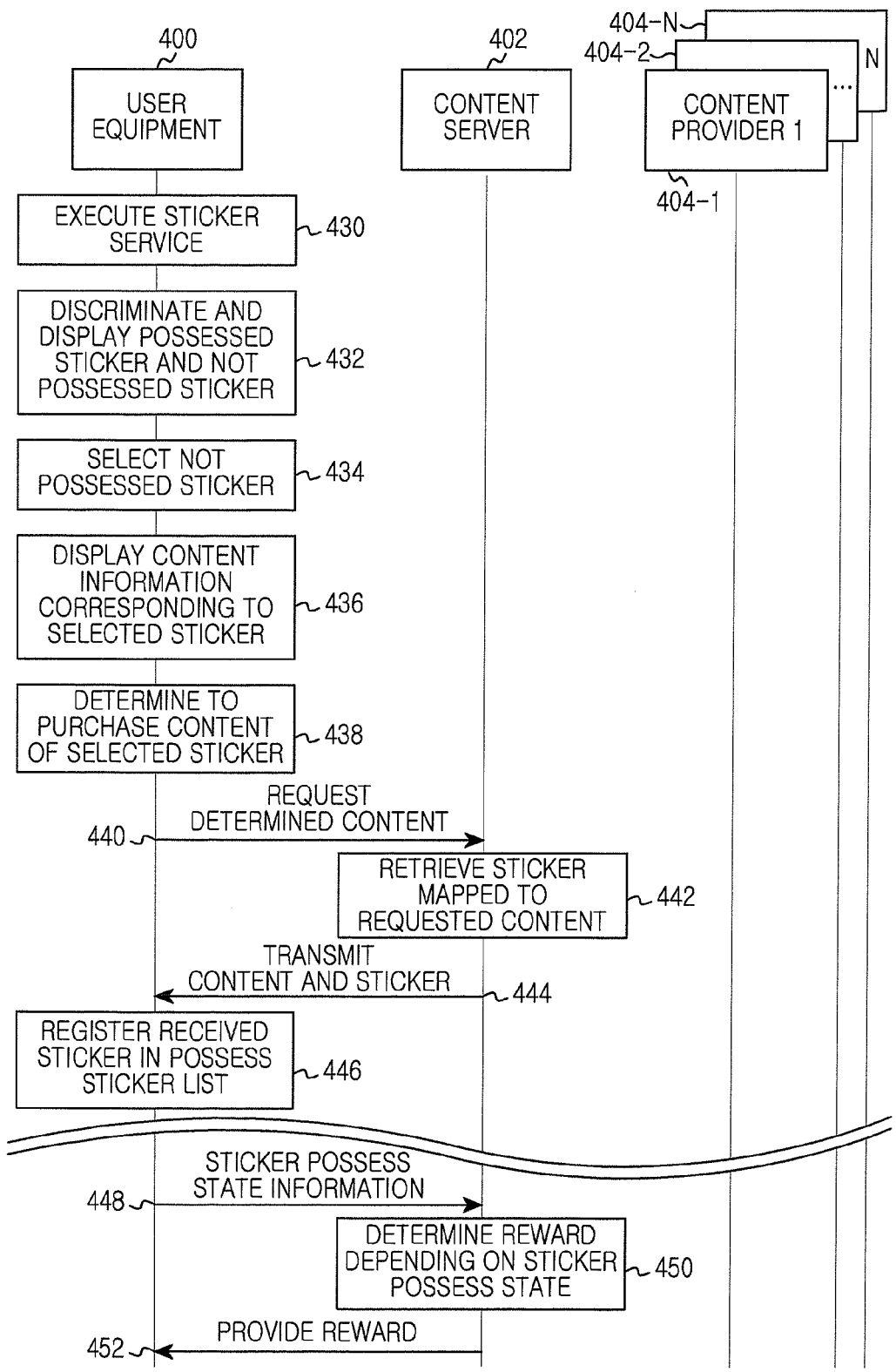

FIGS. 4A and 4B illustrate example signal flows for providing a reward item corresponding to content purchase in a content providing system according to certain embodiments of the present invention.

Referring to FIGS. 4A and 4B, each of a plurality of content providers 404-1 to 404-N registers content in a content server 402 in step 410. The content server 402 generates a sticker for respective registered content and maps the stickers to the content to store the same in step 412. Here, the sticker may be received from a relevant content provider.

When a content server access event occurs under user control in step 414, user equipment 400 proceeds to step 416 to transmit a signal requesting a content list to the content server 402. The content server 402 transmits the content list representing stored content to the user equipment 400 in step 418. At this point, the content server 402 may transmit corresponding sticker information for respective content included in the content list together.

The user equipment 400 determines content to purchase among the content included in the content list under the user control in step 420, and proceeds to step 422 to transmit a signal requesting the determined content to the content server 402. At this point, the content server 402 retrieves the content requested by the user equipment 400 and a sticker associated with the requested content in step 424, and proceeds to step 426 to transmit the retrieved content and sticker to the user equipment 400.

The user equipment 400 that has received the content and the sticker stores the received content and sticker and determines information associated with received sticker to register the information associated with sticker in a possess sticker list representing a possess sticker state of the user equipment in step 428.

When the sticker service is executed under the user control in step 430, the user equipment 400 proceeds to step 432 to discriminate a possessed sticker and a not possessed sticker to display a sticker list representing stickers that can be obtained from the content server 402. For example, the possessed sticker may be displayed by directly displaying an original image or highlighting the image. The not possessed sticker may be displayed by changing color of an original image dimly or processing an outline region using a dotted line.

When a not possessed sticker is selected by the user in step 434, the user equipment 400 proceeds to step 436 to display content information corresponding to the selected not possessed sticker. That is, in case of purchasing certain content, the user equipment 400 displays information as to whether the possessed sticker can be obtained. In addition, the user equipment 400 may display a message window requesting determination as to whether to purchase relevant content.

The user equipment 400 determines to purchase content associated with the selected not possessed sticker under user control in step 434, and transmits a signal requesting the determined content to the content server 402 in step 440. At this point, the content server 402 retrieves content requested by the user equipment 400 and a sticker associated with the requested content in step 442, and proceeds to step 444 to transmit the retrieved content and sticker to the user equipment 400.

The user equipment 400 stores the received content and sticker, and determines information associated with received sticker to register the information associated with sticker in a possess sticker list representing a possess sticker state of the user equipment in step 446.

The user equipment 400 transmits the possess sticker state information to the content server 402 in step 448. The content server 402 determines a reward item depending on the sticker possess state of the user equipment 400 in step 450, and proceeds to step 452 to provide the determined reward item. At this point, the user equipment 400 may transmit a content purchase history or a content use history to the content server 402 instead of the sticker possess state, and receive a reward thereto.

Figure 5A:
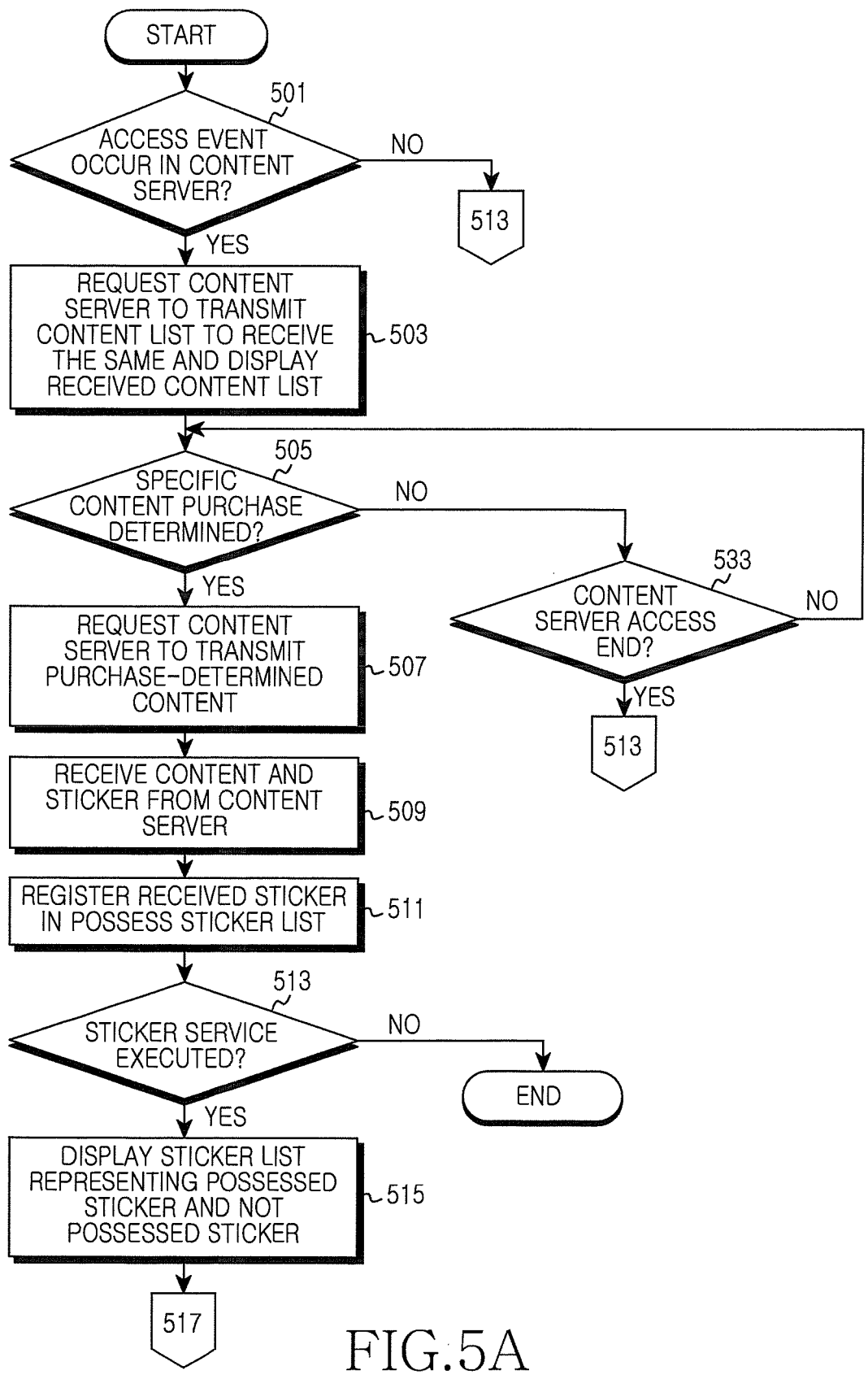
FIGS. 5A and 5B illustrate example process for operating user equipment according to certain embodiments of the present invention.
Figure 5B:
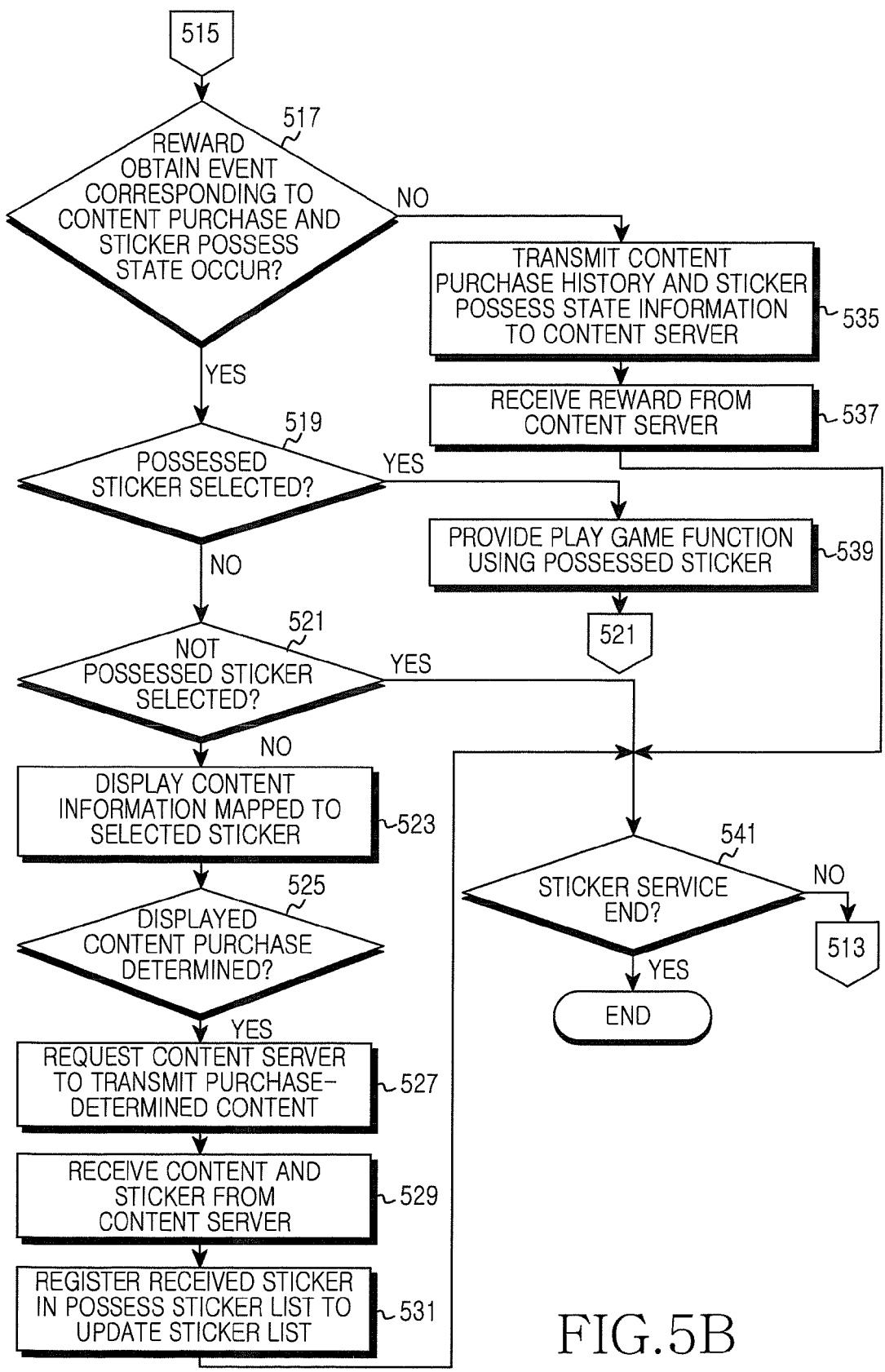

FIGS. 5A and 5B illustrate example processes for operating user equipment according to certain embodiments of the present invention.

Referring to FIGS. 5A and 5B, the user equipment determines whether an event for accessing a content server occurs under user control in step 501. When the event for accessing the content server does not occur under the user control, the user equipment immediately proceeds to step 513.

In contrast, when the event for accessing the content server occurs under the user control, the user equipment proceeds to step 503 to request the content server to transmit a content list and receive the same, and display the received content list on a screen.

The user equipment determines whether specific content are purchased under the user control in step 505. When the purchase of the specific content is not determined, the user equipment proceeds to step 533 to determine whether a content server access ends. When the content server access ends, the user equipment immediately proceeds to step 513. When the content server access does not end, the user equipment returns to step 505.

In contrast, when the purchase of the specific content is determined, the user equipment proceeds to step 507 to request that the content server transmit the purchase-determined content, and receive the requested content and a sticker associated with the requested content from the content server in step 509. At this point, the user equipment may receive an ID of the sticker. After that, the user equipment determines information associated with the received sticker to register the information associated with the sticker in a possess sticker list representing a possess sticker state of the user equipment in step 511. At this point, the user equipment may provide information as to the sticker has been obtained via purchase of which content afterward by storing information regarding content received together with the sticker.

After that, the user equipment determines whether a sticker service is executed in step 513. When the sticker service is not executed, the user equipment ends the algorithm.

When the sticker service is executed, the user equipment displays a sticker list discriminating and displaying a possessed sticker and a not possessed sticker in step 515. For example, as illustrated in FIG. 7A, possessed stickers 701 may be directly displayed as their original images, and not possessed stickers 703 may be displayed by displaying them dimly using dotted lines. Here, the sticker list may include all stickers that can be obtained from the content server and may include only stickers of a specific category that can be obtained from the content server. Of course, in the case where the sticker list includes only the stickers of the specific category, the user equipment should receive an ID of a relevant sticker and category information when receiving the sticker from the content server, and should classify and manage received stickers for each category. Here, each of the stickers illustrated in FIG. 7A may be a sticker associated with content provided by content providers different from each other.

After that, the user equipment determines whether a reward obtain event corresponding to content purchase and a sticker possess state occurs in step 517. Here, the reward obtain event may occur when a predetermined reward obtain condition is met or under user control. For example, the reward obtain event may occur when the user equipment possesses a predetermined number of stickers, or when the user equipment possesses all stickers of a specific category, and may occur depending on the user's reward item obtain menu selection.

When the reward obtain event corresponding to the content purchase and the sticker possess state occurs, the user equipment transmits a content purchase history and a sticker possess state information to the content server in step 535, and receives a reward item from the content server in step 537. At this point, when the content purchase and the sticker possess state of the user equipment do not meet a reward condition of the content server, the user equipment may receive a signal representing that the reward condition is not met from the content server. After that, the user equipment proceeds to step 541 to determine whether the sticker service ends. When the sticker service does not end, the user equipment returns to step 519. When the sticker service ends, the user equipment ends the algorithm according to the present invention.

Meanwhile, when the reward obtain event corresponding to the content purchase and the sticker possess state does not occur, the user equipment proceeds to step 519 to determine whether a possessed sticker is selected from the sticker list displayed on the screen.

When the possessed sticker is not selected, the user equipment proceeds to step 521 to determine whether a not possessed sticker is selected. When the not possessed sticker is not selected, the user equipment proceeds to step 541 to perform subsequent steps.

Figure 8A:
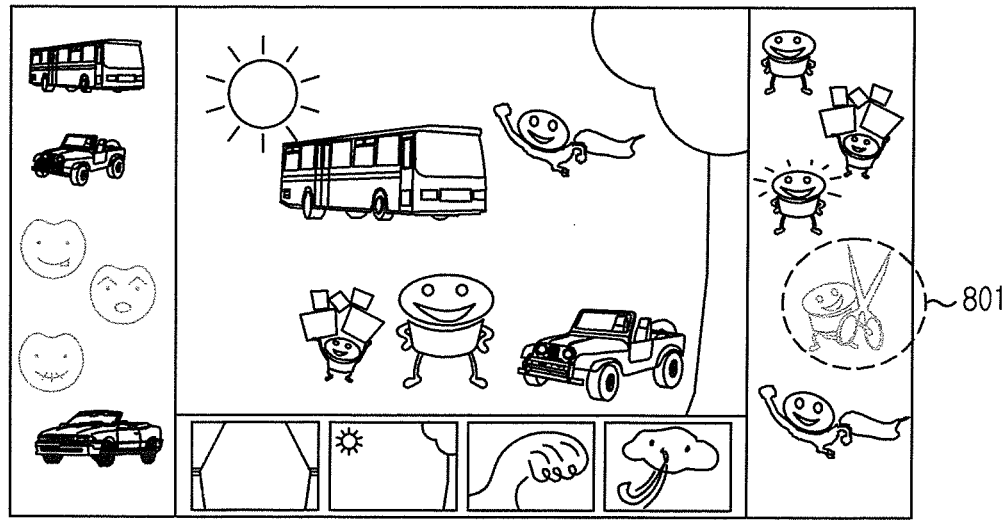
FIGS. 8A and 8B illustrate example screen configurations for promoting content purchase using a reward item in user equipment according to certain embodiments of the present invention.
Figure 8A:
Figure 8A:
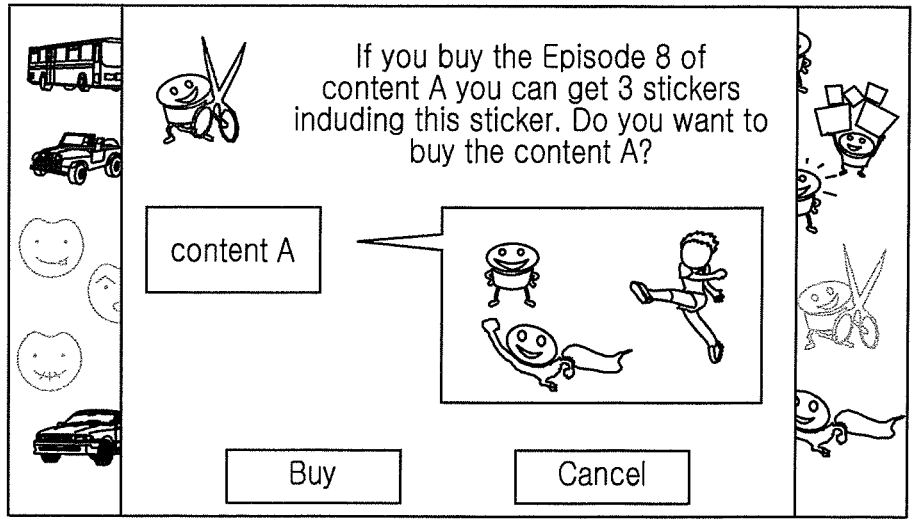

In contrast, when the not possessed sticker is selected, the user equipment displays content information associated with the selected not possessed sticker in step 523. Here, the user equipment may display content information associated with the not possessed sticker by obtaining in advance information regarding all stickers possessed by the content server and stickers associated with respective content from the content server. For example, as illustrated in FIG. 8A, in the case where the user selects a specific not possessed sticker 801 displayed dimly, the user equipment may obtain the selected not possessed sticker when purchasing a series 8 of content A. At this point, the user equipment may display that other stickers may be additionally obtained besides the selected not possessed sticker.

After that, the user equipment determines whether purchase of the displayed content is determined under user control in step 525. When the purchase of the displayed content is not determined, the user equipment returns to step 519 to re-perform subsequent steps. When the purchase of the displayed content is determined, the user equipment proceeds to step 527 to request the content server to provide the purchase-determined content. After that, the user equipment may receive the content and the not possessed sticker associated with the content from the content server in step 529. The user equipment determines information associated with received sticker to register the information associated with sticker in a possess sticker list representing a possess sticker state of the user equipment in step 531 and proceeds to step 541.

In contrast, when the possess sticker is selected, the user equipment proceeds to step 539 to provide a game playing function that uses a sticker possessed by the user equipment. For example, as illustrated in FIG. 7A, the user equipment may arrange possessed stickers 701 on a desired position of the screen under user control, and change the background screen. At this point, though not shown, the user equipment may control the size, rotation angle, color, and the like of the possessed sticker under the user control. In addition, as illustrated in FIG. 7B, the user equipment may input text on the screen under user control to provide a game where character stickers make a conversation. At this point, the user equipment may convert a voice signal inputted from the user into text to provide a conversation game as illustrated in FIG. 7B, and may convert a voice signal or a text character inputted from the user into a voice signal of a designated voice to provide an effect as if a character of a specific sticker talked. Additionally, the user equipment may provide a game function of configuring a plurality of scenes using the possessed stickers and making one story book using the plurality of scenes. In addition, the user equipment may provide a function of applying a dynamic effect to each sticker to produce a moving picture.

Figure 8B:
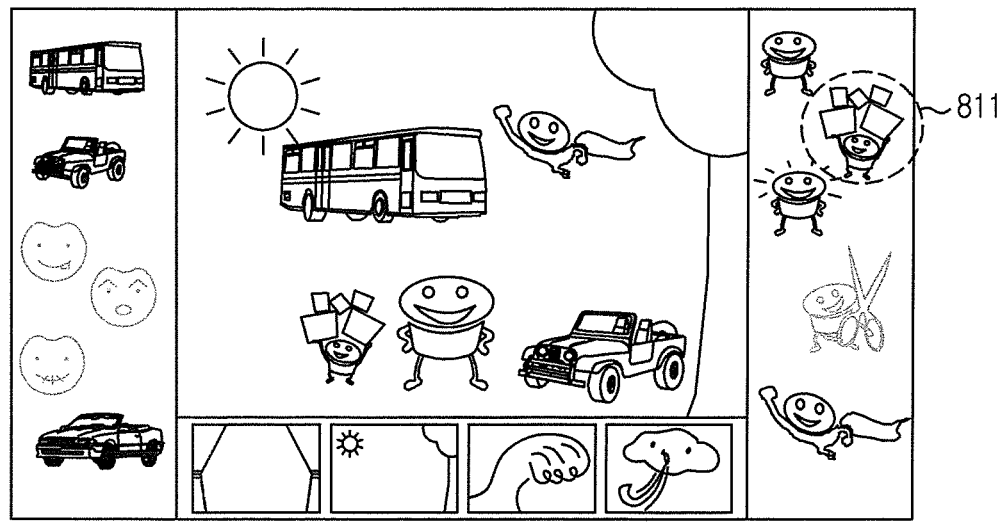
Figure 8B:
Figure 8B:
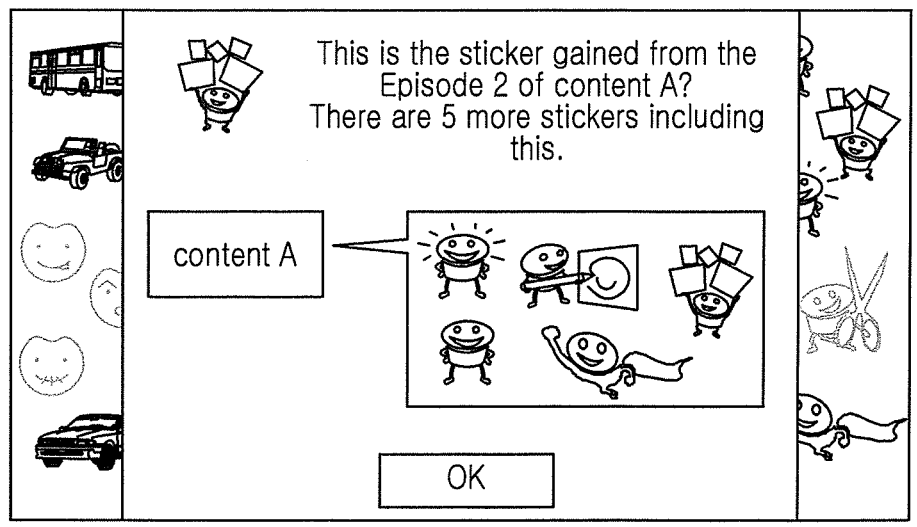

Of course, when a possessed sticker is selected in step 519, the user equipment may display content information associated with the possessed sticker. For example, as illustrated in FIG. 8B, in the case where the user selects a specific possessed sticker 811 displayed clearly, the user equipment may purchase a series 2 of content A to represent that the selected possessed sticker 811 has been obtained. At this point, the user equipment may display other stickers obtained by purchasing the series 2 of the content A together.

Figure 6:
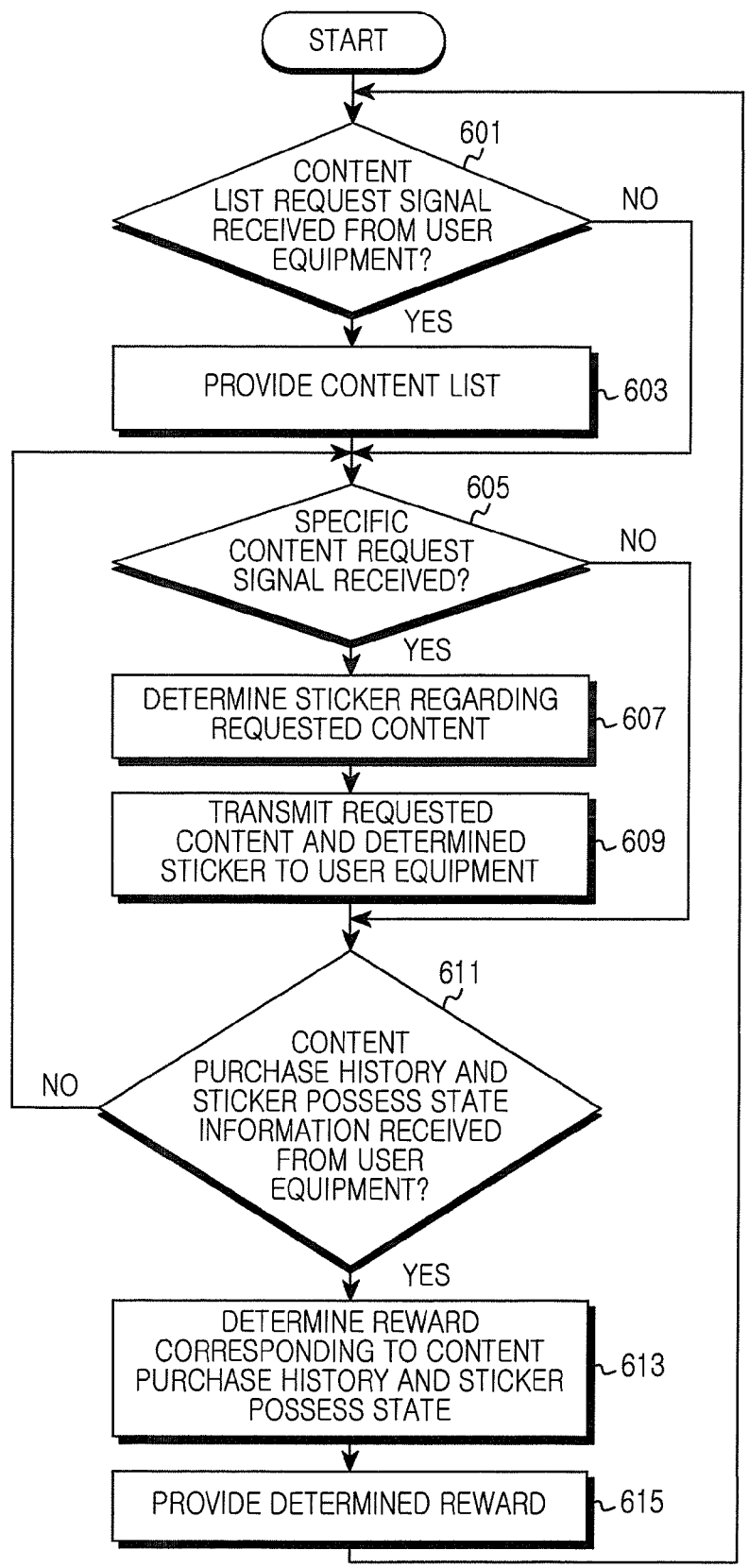
FIG. 6 illustrates an example process for operating a content server according to certain embodiments of the present invention.

FIG. 6 illustrates an example process for operating a content server according to certain embodiments of the present invention. Here, description is made on the assumption that the content server receives content from a plurality of content providers and stores a sticker for respective content.

Referring to FIG. 6, the content server determines whether a signal requesting a content list is received from user equipment in step 601. When the signal requesting the content list is not received, the content server immediately proceeds to step 605. When the signal requesting the content list is received, the content server transmits the content list representing content stored in the content server to the user equipment in step 603.

The content server determines whether a signal requesting specific content is received from the user equipment in step 605. When the signal requesting the specific content is not received, the content server immediately proceeds to step 611. In contrast, when the signal requesting the specific content is received, the content server proceeds to step 607 to determine a sticker associated with the requested content. After that, the content server transmits the requested content and the determined sticker to the user equipment in step 609.

After that, the content server determines whether information representing content purchase or a content use history and a sticker possess state is received from the user equipment in step 611. When the information is received, the content server determines a reward item to be provided to the user equipment using a predetermined reward item table for each content purchase or each consumption history or a predetermined reward item table for each sticker possess state in step 613. At this point, the reward item may be a sticker, and may be various items such as other content associated with the content, a point, a content purchase related coupon, and the like After that, the content server provides the determined reward item to the user equipment in step 615, and returns to step 601 to re-perform subsequent steps. Here, in the case where the content purchase or consumption history and a sticker possess state of the user equipment do not meet a predetermined condition and so a relevant reward item cannot be determined in the table, the content server may transmit a signal representing that the content purchase or consumption history and the sticker possess state of the user equipment has not met the predetermined reward condition. At this point, when the user equipment purchases specific content or a predetermined number of content additionally, the content server may inform the user equipment that the reward condition is met and induce additional purchase of content.

Methods according to various embodiments described in claims and/or specification of the present invention may be implemented in hardware, software, or a combination of the hardware and the software.

In the case of implementing the method using software, a computer-readable storage medium storing one or more programs (software module) may be provided. One or more programs stored in the computer-readable storage medium are configured for execution by one or more processors inside an electronic device. One or more programs include instructions for allowing the electronic device to execute methods according to the embodiments described in claims and/or specification of the present invention.

The present invention provides a game playing service that simultaneously uses various reward items provided by content providers different from each other to stimulate a user's desire of collecting various reward items and playing game, thereby obtaining an effect of inducing the user to purchase more various content. Particularly, in case of children-oriented content, the present invention provides a reward item to a user not only when the user purchases the content but also when the user uses content to provide various game playing services, thereby promoting children's content use and maximizing an edutainment effect.

This program (a software module, software) may be stored in a non-volatile memory including Random Access Memory (RAM) and a flash memory, Read Only Memory (ROM), Electrically Erasable Programmable Read Only Memory (EEPROM), a magnetic disc storage device, a Compact Disc (CD)-ROM, Digital Versatile Discs (DVDs) or an optical storage device of a different type, and a magnetic cassette. Alternatively, the program may be stored in a memory formed of a combination of a portion or all of these devices. Alternatively, a plurality of respective memories may be provided.

In addition, the program may be stored in an attachable storage device that can access the electronic device via a communication network such as the Internet, an Intranet, a Local Area Network (LAN), a Wide LAN (WLAN), and a Storage Area Network (SAN), or a communication network configured in combination of them. This storage device may access the electronic device via an external port.

In addition, a separate storage device on a communication network may access a mobile electronic device.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A content providing method comprising:
   receiving, by a communication unit of an electronic device, a content list including a plurality of contents and information on reward items corresponding to each of the plurality of contents, wherein the plurality of contents are provided from providers that are different from each other;
   receiving, by an input unit of the electronic device, a selection of a specific content based on the information on reward items, wherein the specific content is selected from among the plurality of contents included in the content list;
   transmitting by the communication unit of the electronic device, a request for providing the specific content to a content server;
   receiving, by the communication unit of the electronic device, the specific content from the content server and one or more the reward items associated with the specific content together from the content server; and
   displaying, by a display unit of the electronic device, a reward item list representing the reward items corresponding to the plurality of contents.

2. The content providing method of claim 1, further comprising:
   providing, by a controller of the electronic device, a game playing function that simultaneously uses the reward items associated with content having content providers that are different from each other,
   wherein the game playing function comprises at least one of position change, size change, color change, rotation angle change of the reward items, text input, voice signal input, dynamic effect application, scene generation, and moving picture generation.

3. The content providing method of claim 1, wherein the reward item list represents the reward items possessed by the content server and not possessed by the electronic device.

4. The content providing method of claim 3, wherein the reward item list discriminates and displays one of the reward items possessed by the electronic device and another one of the reward items not possessed by the electronic device.

5. The content providing method of claim 3, further comprising:
receiving, by the input unit of the electronic device, a selection of the other reward item not possessed by the electronic device from the reward item list under user control; and
displaying, by a display unit of the electronic device, information regarding content associated with the selected reward item, wherein the information associated with the content associated with the selected reward item comprises at least one of link information associated with relevant content and relevant content purchase guide information.

6. The content providing method of claim 5, further comprising:
receiving, by the input unit of the electronic device, a selection of the content associated with the other reward item not possessed by the electronic device; and
requesting, by the communication unit of the electronic device, the content server to transmit the content using the link information associated with relevant content and the relevant content purchase guide information.

7. The content providing method of claim 1, further comprising:
transmitting, by the communication unit of the electronic device, information representing at least one of a content purchase history, a content use history, and a reward item possess state of the electronic device to the content server; and
receiving, by the communication unit of the electronic device, an additional reward item from the content server.

8. A content providing method comprising:
receiving, by a communication unit of a content server, a plurality of content from a plurality of content providers;
determining, by a controller of the content server, a corresponding one or more reward items for respective received content;
transmitting, by the communication unit of the content server, a content list including the plurality of contents and information on the reward items corresponding to each of the plurality of contents; and
in response to receiving a request for providing a specific content from an electronic device, transmitting, by the communication unit of the content server, the requested content and the reward items corresponding to the requested content together to the electronic device,
wherein the specific content is selected by the electronic device based on the information on reward items and selected from among the plurality of contents included in the content list.

9. The content providing method of claim 8, further comprising:
transmitting, by the communication unit of the content server, information regarding at least one content possessed by the content server and information regarding the reward items corresponding to the at least one content to the electronic device.

10. The content providing method of claim 8, further comprising:
receiving, by the communication unit of the content server, information representing at least one of a content purchase history, a content use history, and a reward item possess state from the electronic device;
analyzing, by the controller of the content server, the received information to determine an additional reward item; and transmitting the determined additional reward item to the electronic device.

11. A content providing system comprising:
an electronic device comprising:
a communication unit configured to communicate with a content server; and
a controller configured to control functions for:
receiving, by the communication unit of the electronic device, a content list including a plurality of contents and information on reward items corresponding to each of the plurality of contents, wherein the plurality of contents are provided from providers that are different from each other,
receiving, by an input unit of the electronic device, a selection of a specific content based on the information on reward items, wherein the specific content is selected from among the plurality of contents included in the content list,
transmitting by the communication unit of the electronic device, a request for providing the specific content to the content server,
receiving, by the communication unit of the electronic device, the specific content and one or more the reward items associated with the specific content together from the content server as a response to receiving the specific content provide request from the electronic device,
generating a reward item list representing the reward items corresponding to the plurality of contents, and
displaying, by a display unit of the electronic device, the reward item list.

12. The system of claim 11, wherein the controller provides a game playing function that simultaneously uses the reward items associated with content having content providers that are different from each other, and the game playing function comprises at least one of a position change, a size change, a color change, a rotation angle change of the reward item, a text input, a voice signal input, a dynamic effect application, a scene generation, and a moving picture generation.

13. The system of claim 11, wherein the reward item list represents one of the reward items possessed by the content server and not possessed by the electronic device.

14. The system of claim 13, wherein the reward item list discriminates and displays the one of the reward items possessed by the electronic device and another one of the reward items not possessed by the electronic device.

15. The system of claim 13, wherein the controller is configured to control a function for receiving a selection of the reward item not possessed by the electronic device from the reward item list under user control, and display information regarding content associated with the selected reward item, and
the information associated with the content associated with the selected reward item comprises at least one of link information associated with relevant content and relevant content purchase guide information.

16. The system of claim 15, wherein the controller is configured to control a function for receiving, by the input unit of the electronic device, a selection of the content associated with the reward item not possessed by the electronic device, and control a function for requesting, by the communication unit of the electronic device, the content server to transmit the content using the link information associated with relevant content and the relevant content purchase guide information.

17. The system of claim 11, wherein the controller is configured to control a function for transmitting, by the communication unit of the electronic device, information representing at least one of a content purchase history, a content use history, and a reward item possess state of the electronic device to the content server, and receiving, by the communication unit of the electronic device, an additional reward item from the content server.

18. A content providing system comprising:
a content server comprising:
    a communication unit configured to communicate with an electronic device and a plurality of content providers; and
a controller configured to control functions for:
receiving, by the communication unit of the content server, a plurality of content from the plurality of content providers, determining a corresponding reward item for respective received content,
transmitting, by the communication unit of the content server, a content list including the plurality of contents and information on the reward items corresponding to each of the plurality of content, and
in response to receiving a request for providing a specific content from the electronic device, transmitting, by the communication unit of the content server, the requested content and one or more reward items corresponding to the requested content together to the electronic device,
wherein the specific content is selected by the electronic device based on the information on reward items and selected from among the plurality of contents included in the content list.

19. The system of claim 18, wherein the controller is configured to control a function for transmitting, by the communication unit of the content server, information regarding at least one content possessed by the content server and information regarding one of the reward items corresponding to the at least one content to the electronic device.

20. The system of claim 18, wherein the controller is configured to control functions for receiving, by the communication unit of the content server, information representing at least one of a content purchase history, a content use history, and a reward item possess state from the electronic device via the communication unit, analyze the received information to determine an additional reward item, and transmit the determined additional reward item to the electronic device.

* * * * *